US012790866B2

(12) United States Patent
Hane

(10) Patent No.: US 12,790,866 B2
(45) Date of Patent: Nov. 10, 2026

(54) ARRANGEMENT FOR GUIDING AT LEAST TWO FURNITURE DOORS

(71) Applicant: Julius Blum GmbH, Hoechst (AT)

(72) Inventor: Andreas Hane, Weiler im Allgaeu (DE)

(73) Assignee: JULIUS BLUM GMBH, Hoechst (AT)

( * ) Notice: Subject to any disclaimer, the term of this patent is extended or adjusted under 35 U.S.C. 154(b) by 156 days.

(21) Appl. No.: 18/636,996

(22) Filed: Apr. 16, 2024

(65) Prior Publication Data

US 2024/0263501 A1 Aug. 8, 2024

Related U.S. Application Data

(63) Continuation of application No. PCT/AT2022/060358, filed on Oct. 14, 2022.

(30) Foreign Application Priority Data

Oct. 22, 2021 (AT) .............................. A 50216/2021

(51) Int. Cl.
*E05D 15/26* (2006.01)

(52) U.S. Cl.
CPC ........ *E05D 15/264* (2013.01); *E05Y 2201/64* (2013.01); *E05Y 2201/684* (2013.01); *E05Y 2600/56* (2013.01); *E05Y 2900/20* (2013.01)

(58) Field of Classification Search
CPC ............... E05D 15/264; E05Y 2201/64; E05Y 2201/684; E05Y 2600/56; E05Y 2900/20
USPC .......................................................... 160/201
See application file for complete search history.

(56) References Cited

U.S. PATENT DOCUMENTS 2,649,612 A 8/1953 Loomis
2,778,051 A 1/1957 Menz
2,940,112 A * 6/1960 Riser .................. E05D 15/0634 16/105

(Continued)

FOREIGN PATENT DOCUMENTS

CN 110621840 12/2019
DE 10 2019 121 404 2/2021

(Continued)

OTHER PUBLICATIONS

International Search Report issued Jan. 2, 2023 in International (PCT) Application No. PCT/AT2022/060358.

*Primary Examiner* — Kristina R Fulton
(74) *Attorney, Agent, or Firm* — Wenderoth, Lind & Ponack, L.L.P.

(57) ABSTRACT

An arrangement for guiding at least two furniture doors relative to a stationary furniture part includes: at least two guide rails; a first carriage mounted (possibly movably) on a first of the guide rails and which is connectable to a first of the at least two furniture doors; and a second carriage mounted (possibly movably) on the other of the guide rails and which is connectable to another of the at least two furniture doors. A connection device can releasably connect the guide rails at one end, the guide rails being arranged substantially in alignment with one another when in a connected state. An adjustment device can allow an adjustment of at least two ends of the guide rails relative to the stationary furniture part in a direction transverse to a longitudinal extent of the guide rails.

16 Claims, 6 Drawing Sheets

(56) References Cited

U.S. PATENT DOCUMENTS

| | | | | |
|---|---|---|---|---|
| 4,646,471 | A * | 3/1987 | Shaiu | E05D 15/06 49/411 |
| 11,098,512 | B2 | 8/2021 | Blum et al. | |
| 2006/0010774 | A1 * | 1/2006 | Peterson | E06B 3/4654 49/372 |
| 2016/0312520 | A1 * | 10/2016 | Berger | A47B 61/00 |
| 2020/0048946 | A1 | 2/2020 | Blum et al. | |
| 2021/0363803 | A1 * | 11/2021 | Sperger | E05D 15/26 |
| 2022/0074250 | A1 | 3/2022 | Duer | |
| 2022/0307307 | A1 | 9/2022 | Rupp et al. | |

FOREIGN PATENT DOCUMENTS

| | | | | |
|---|---|---|---|---|
| DE | 20 2020 107 257 | | 2/2021 | |
| EP | 3 037 612 | | 6/2016 | |
| EP | 3 460 152 | | 3/2019 | |
| FR | 2 901 829 | | 12/2007 | |
| JP | 2004-116247 | | 4/2004 | |
| JP | 2020-519790 | | 7/2020 | |
| TW | 202100854 | | 1/2021 | |
| TW | 202129140 | | 8/2021 | |
| WO | 2015/155591 | | 10/2015 | |
| WO | 2018/204952 | | 11/2018 | |
| WO | WO-2018204952 | A1 * | 11/2018 | A47B 61/00 |
| WO | 2021/023772 | | 2/2021 | |
| WO | WO-2021023772 | A1 * | 2/2021 | F16B 2/065 |

* cited by examiner

-- PRIOR ART --

-- PRIOR ART --

ARRANGEMENT FOR GUIDING AT LEAST TWO FURNITURE DOORS

The present application is a continuation of International Application PCT/AT2022/060358 filed on Oct. 14, 2022. Thus, all of the subject matter of International Application PCT/AT2022/060358 is incorporated herein by reference.

BACKGROUND OF THE INVENTION

The invention relates to an arrangement for guiding at least two furniture doors, in particular at least two folding sliding doors, relative to a stationary furniture part.

Such arrangements are already known from the state of the art. In such solutions according to the state of the art, however, the furniture doors can buckle. As a result, the furniture doors are no longer flush with each other in the center of a piece of furniture, where the furniture doors adjoin each other. In particular, if a panel or the like is provided above or underneath the at least two furniture doors, this results in a visually dissonant overall image of a piece of furniture. This problem cannot be solved using conventional possibilities for adjusting furniture doors—panel gap, height, transverse adjustment.

FIGS. 2*a* and 2*b* illustrate the described misalignment clearly.

SUMMARY OF THE INVENTION

The object of the present invention is to avoid the described disadvantages according to the state of the art and to specify an arrangement which is improved compared with the state of the art, for guiding at least two furniture doors, in particular at least two folding sliding doors, relative to a stationary furniture part, as well as a piece of furniture with such an arrangement.

Accordingly, at least one adjusting device is provided, with which the at least two ends of the at least two guide rails are adjustable relative to the stationary furniture part in a direction transverse to a longitudinal extent of the at least two guide rails.

Thus, only the at least two ends of the at least two guide rails, but not the whole guide rails, are adjusted transverse to a longitudinal extent of the at least two guide rails. The guide rails can accordingly be adjusted in the center of a piece of furniture transverse to a longitudinal extent of the at least two guide rails, whereby the misalignment occurring in the state of the art can be compensated for.

A piece of furniture according to the invention comprises at least two furniture doors, in particular at least two folding sliding doors, as well as a stationary furniture part and such an arrangement according to the invention.

The adjusting device can have a first element, which is arrangeable on a stationary furniture part.

Furthermore, the adjusting device can have a second element, which is arrangeable on at least one, preferably on both, of the at least two ends of the at least two guide rails.

This represents a simple possibility for contacting both the stationary furniture part and the at least two guide rails for an adjustment.

Preferably, the second element is at least partially formed by the connection device. Material, and accordingly also costs, can thereby be reduced.

Furthermore, the adjusting device can have at least one adjusting element.

Preferably, the adjusting element is mounted on or in the second element via a threaded connection and rests against the first element, or is mounted rotatably and non-displaceably on or in the first element.

An adjusting device can thereby be implemented in a simple manner. If the adjusting element is rotated, the second element moves relative to the first element as the adjusting element is mounted rotatably and non-displaceably on or in the second element or rests against the first element.

Depending on a direction of rotation of the adjusting element, the second element can be moved in the direction toward or away from the first element. This means that a rotational movement of the adjusting element can be converted into a linear movement of the second element.

Alternatively, the adjusting element is mounted rotatably and non-displaceably on the second element and is mounted on or in the first element via a threaded connection.

Also in such an embodiment, the second element can be moved relative to the first element by rotating the adjusting element. The two embodiments differ in that the position of the adjusting element relative to the second element or relative to the first element changes.

The adjusting element can be formed as a screw. This represents a simple and cost-effective possibility for implementing an adjusting element.

In an embodiment of the invention, the adjusting device can have an actuating device for indirectly or directly actuating the adjusting element. An actuating device makes it easier for a user to actuate the adjusting element, in particular when the adjusting element sits for example in a place that is difficult to access.

The actuating device can be formed as a screwhead drive. This represents an extremely uncomplicated and cost-effective possibility for implementing an actuating device.

According to an embodiment of the invention, a covering cap is provided for at least partially covering a gap between the at least two guide rails. Such a covering cap contributes to an appealing visual overall image of the arrangement or subsequently of a piece of furniture with such an arrangement.

BRIEF DESCRIPTION OF THE DRAWINGS

Further details and advantages of the invention are explained in more detail below by means of the description of the figures with reference to the drawings, in which.

DETAILED DESCRIPTION OF THE INVENTION

Figure 1:
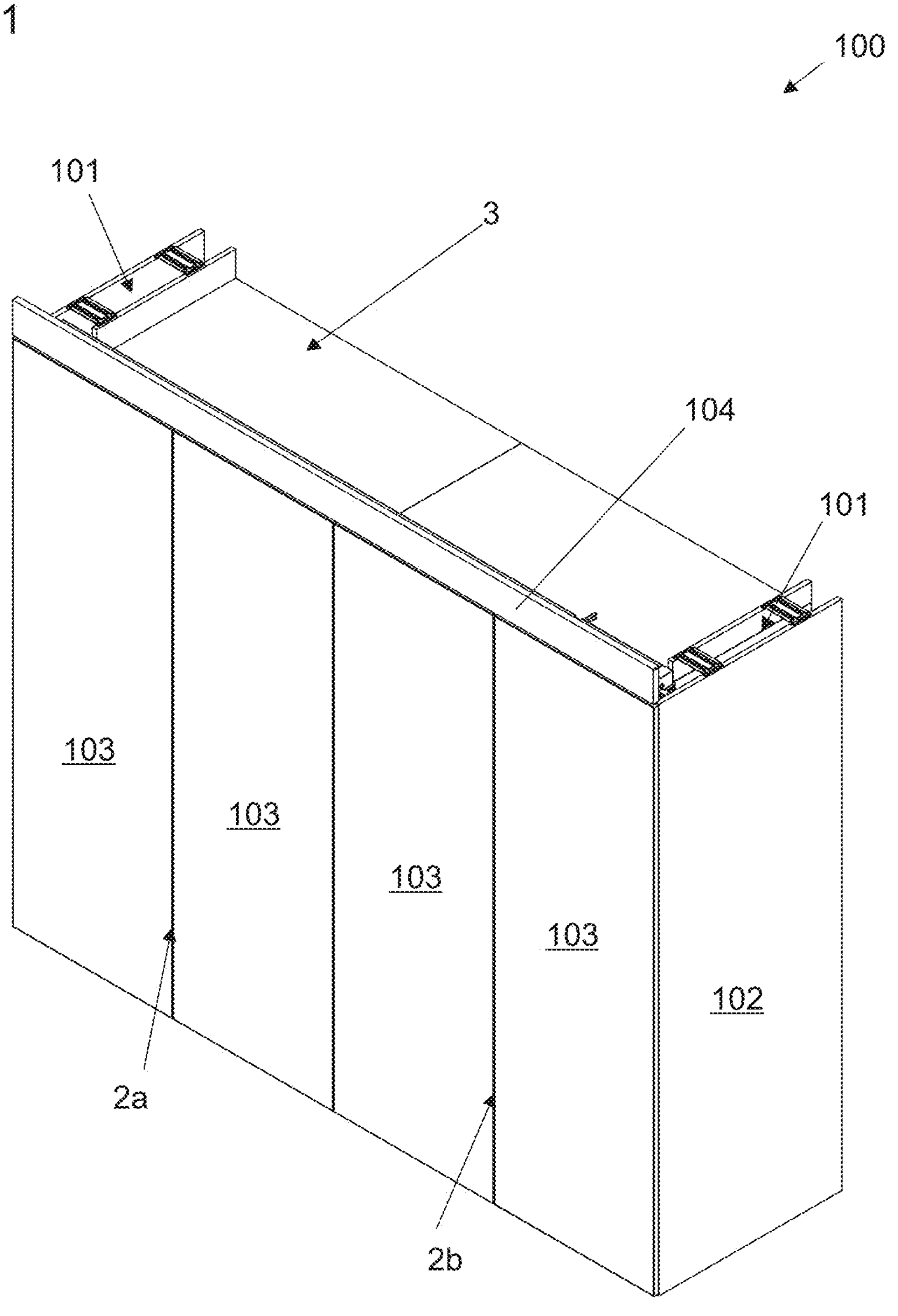
FIG. 1 is a perspective view of a piece of furniture with an embodiment of an arrangement.

FIG. 1 shows a perspective view of a piece of furniture 100 with an arrangement 1. It can be seen that the piece of furniture 100 has a stationary furniture part 3 in the form of a furniture carcass.

Cavities 101, in which furniture doors 2*a*, 2*b* in the form of folding sliding doors can be stowed in an open state of the piece of furniture 100, are visible on the sides of the stationary furniture part 3. The cavities 101 are formed by the stationary furniture part 3 and side walls 102.

The furniture doors 2*a*, 2*b* are formed as folding sliding doors and accordingly have in each case two door leaves 103, which are connected to each other via hinges.

A panel 104 is arranged above the furniture doors 2*a*, 2*b*. For example, a distance from an upper edge of the piece of furniture 100 to a cover can be bridged by means of the panel 104.

Figure 2A:
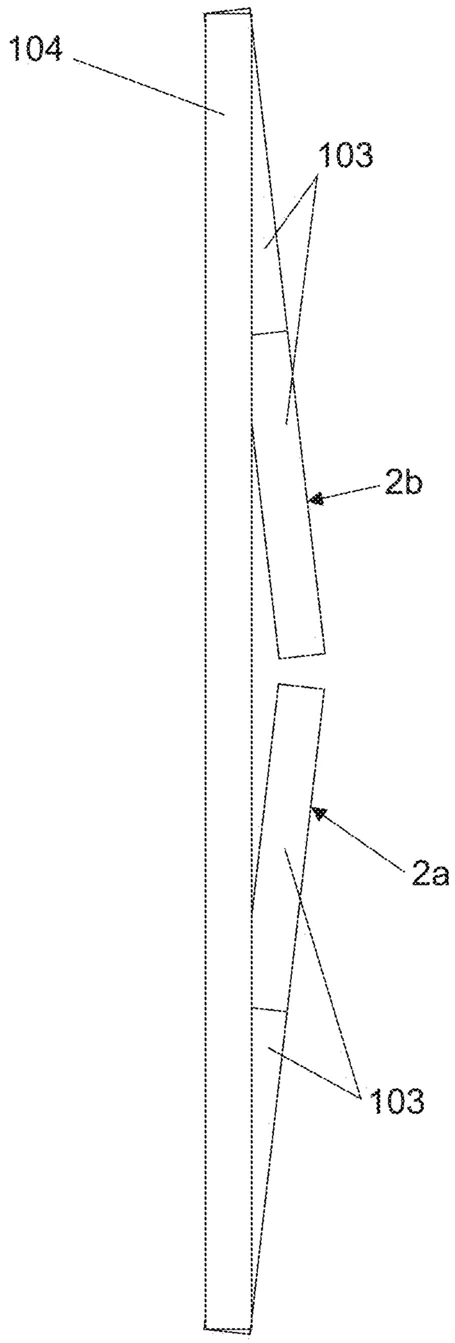
FIG. 2*a* is a schematic top view of furniture doors and a panel according to the state of the art.
Figure 2B:
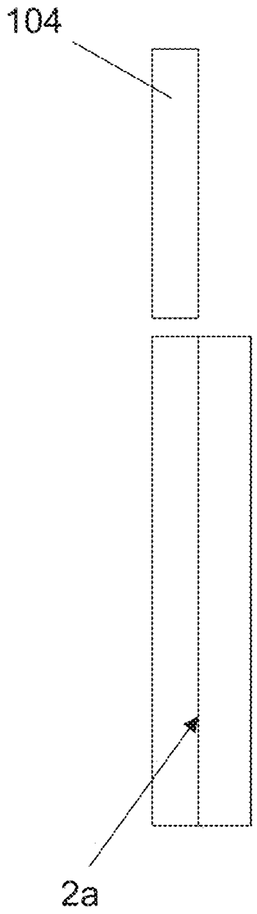
FIG. 2*b* is a schematic side view of furniture doors and a panel according to the state of the art.

FIG. 2*a* shows a schematic top view of furniture doors 2*a*, 2*b* and a panel 104 according to the state of the art, FIG. 2*b* shows a corresponding side view. It can be seen that the furniture doors 2*a*, 2*b* are not flush with each other and with the panel 104 in the center of the panel 104, thus substantially in the center of the piece of furniture 100.

Figure 3A:
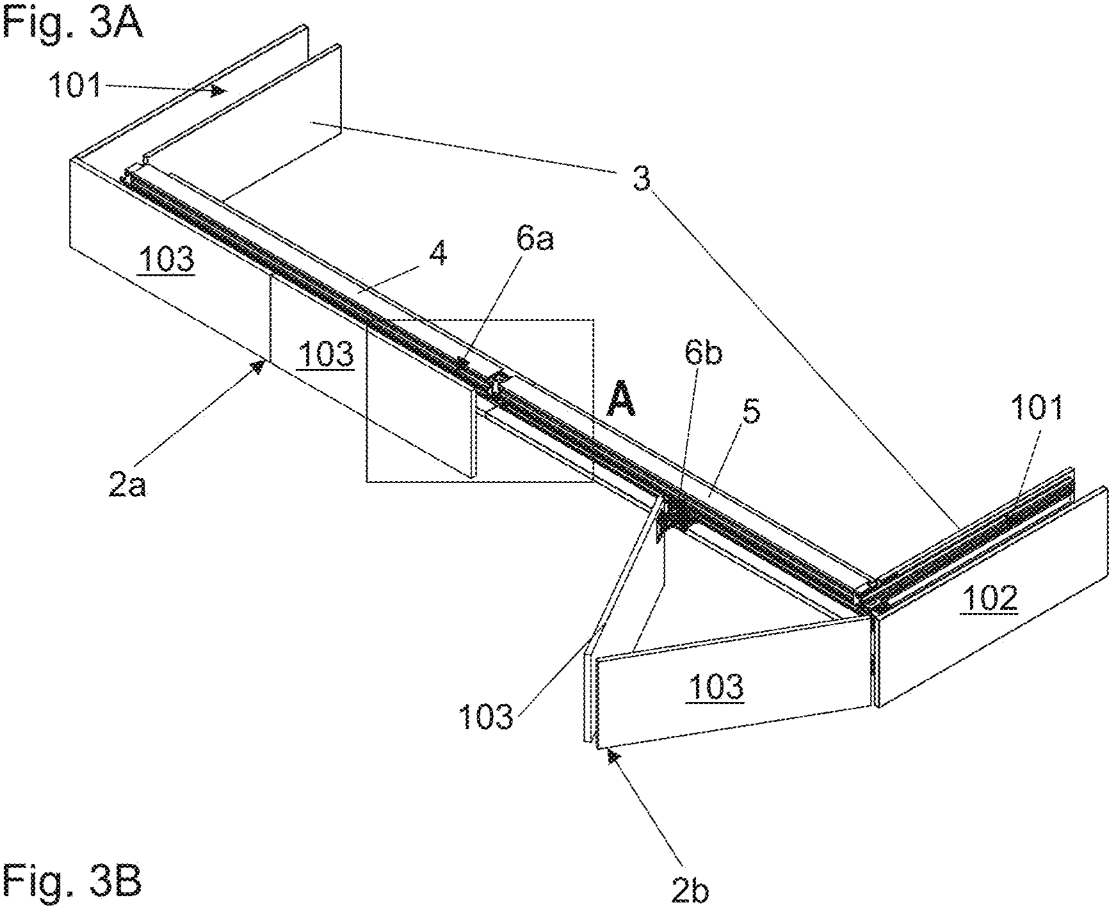
FIG. 3*a* is a perspective view of an embodiment of an arrangement with parts of a piece of furniture.
Figure 3B:
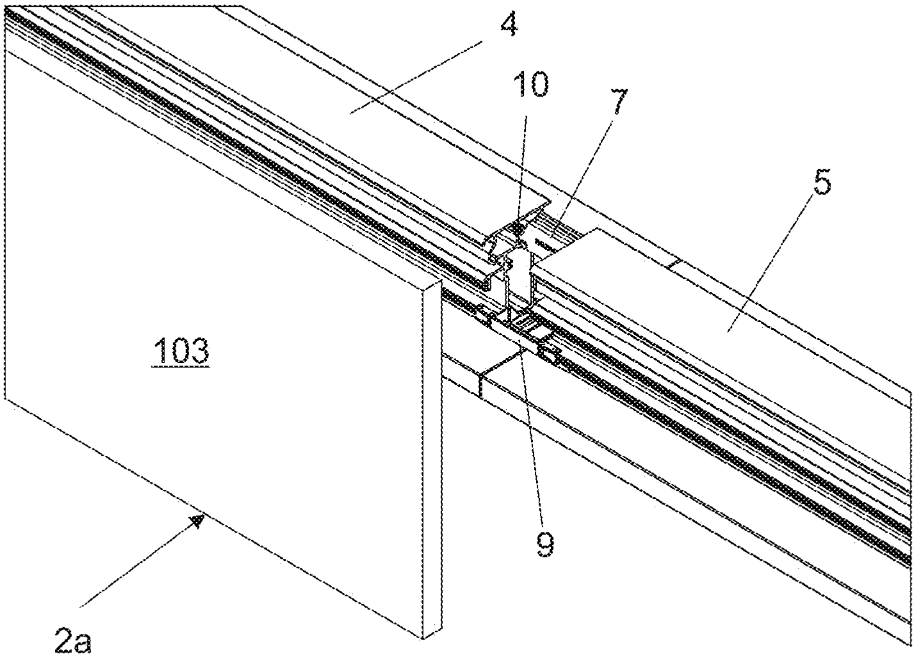
FIG. 3*b* shows detail A from FIG. 3*a*.

FIG. 3*a* shows a perspective view of an arrangement 1 with parts of a piece of furniture 100, FIG. 3*b* shows detail A from FIG. 3*a*. The stationary furniture part 3, the furniture doors 2*a*, 2*b* and the side walls 102 of the piece of furniture 100 are indicated.

It can be seen that the two furniture doors 2*a*, 2*b* are mounted movably on the guide rails 4, 5 via carriages 6*a*, 6*b*. During opening of a furniture door 2*a*, 2*b* the corresponding carriage 6*a*, 6*b* moves along the corresponding guide rail 4, 5. Accordingly, a furniture door 2*a*, 2*b* is guided on the stationary furniture part 3 via the corresponding carriage 6*a*, 6*b* and the corresponding guide rail 4, 5.

The two guide rails 4, 5 are connected to each other via a connection device 7 at in each case one end 4*a*, 5*a*. In addition, a covering cap 9 which at least partially covers a gap 10 between the guide rails 4, 5 is visible. Of course, a covering cap 9 which completely covers the gap 10 can also be provided.

Figure 3C:
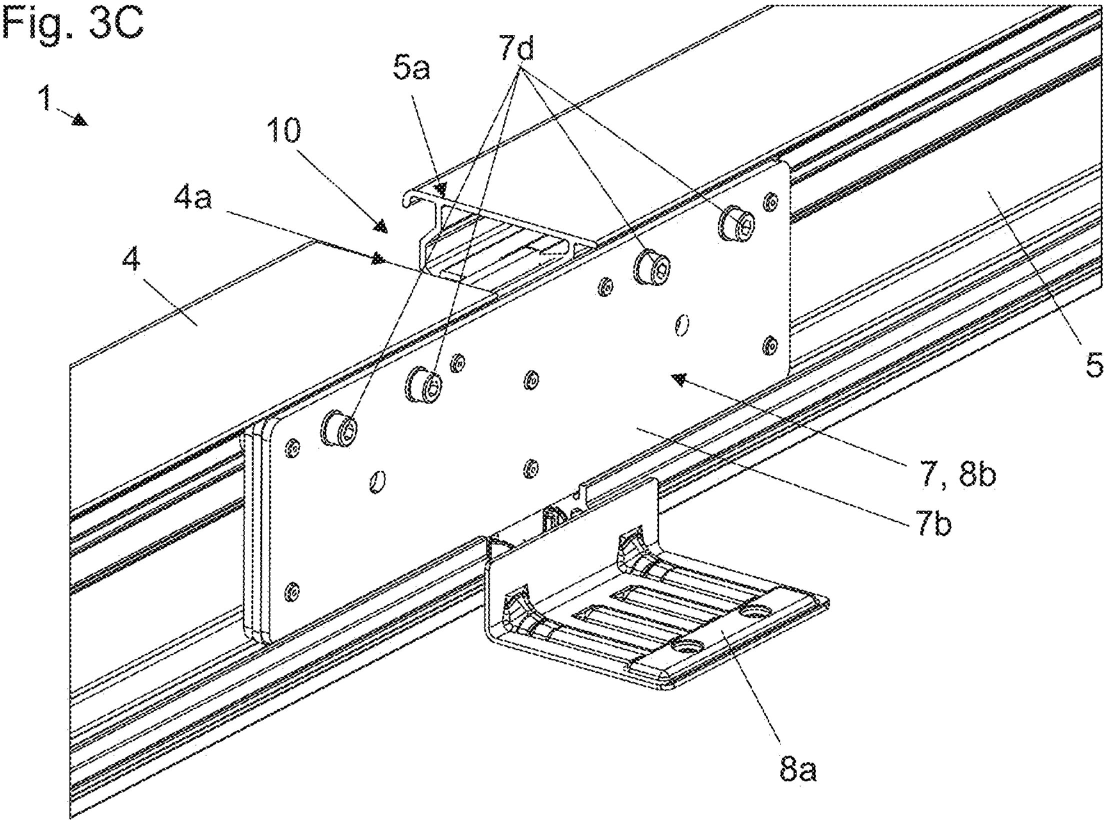
FIG. 3*c* is a perspective rear view of an embodiment of an arrangement.
Figure 3D:
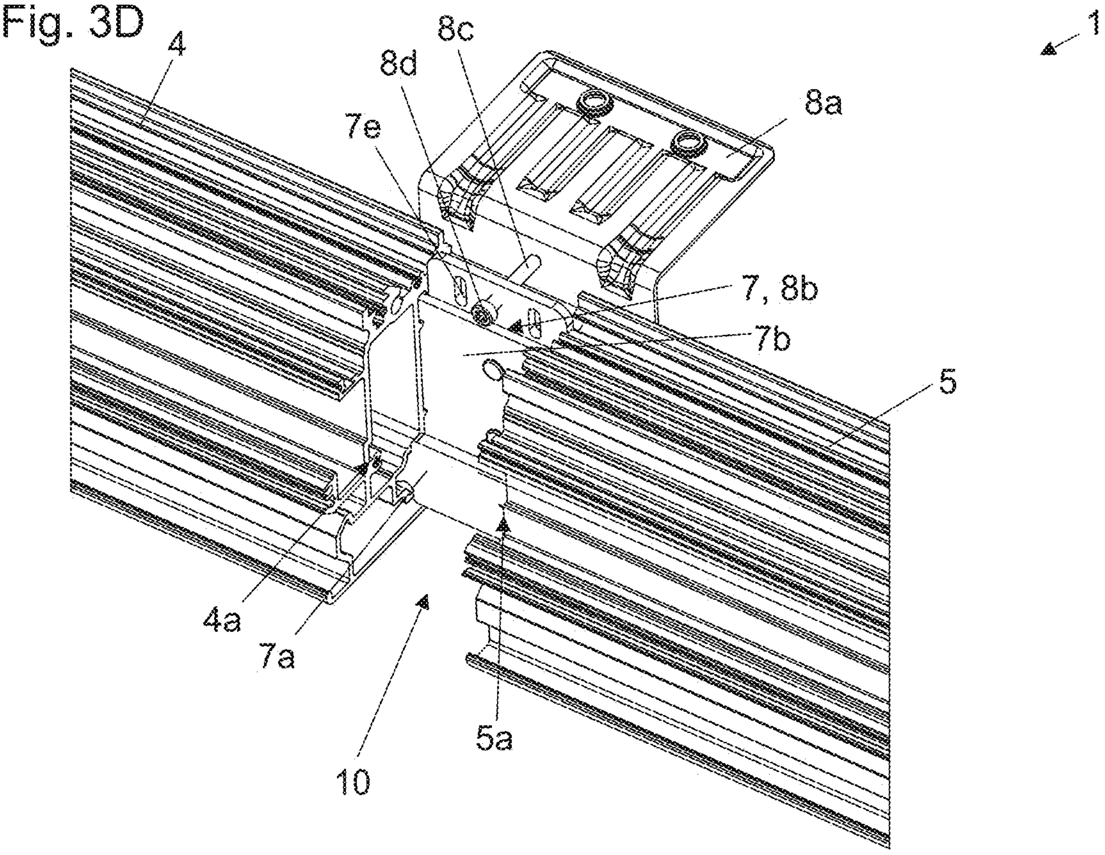
FIG. 3*d* is a perspective front view of an embodiment of an arrangement.

FIG. 3*c* shows a perspective rear view of an arrangement 1, FIG. 3*d* shows a corresponding perspective front view, wherein the arrangement 1 is upside down in FIG. 3*d*.

It can be seen that the connection device 7 has a first clamping element 7*a* and a second clamping element 7*b*. The first clamping element 7*a* can be inserted into the guide rails 4, 5 with tabs 7*c*. The guide rails 4, 5 can be clamped between first clamping element 7*a* and second clamping element 7*b*, and thus detachably connected to each other, via means 7*d*, in the present embodiment screws.

In the present embodiment the connection device 7 forms the second element 8*b* of the adjusting device 8. The adjusting element 8*c* is mounted in the second element 8*b* via a threaded connection and rests against the first element 8*a*. The first element 8*a* thus functions as a limit stop in the present embodiment.

However, other arrangements of the adjusting element 8*c*, as already described, can also be provided.

The adjusting element 8*c* is formed as a screw in the present embodiment, wherein the screwhead drive of the screw forms an actuating device 8*d*.

Figure 4:
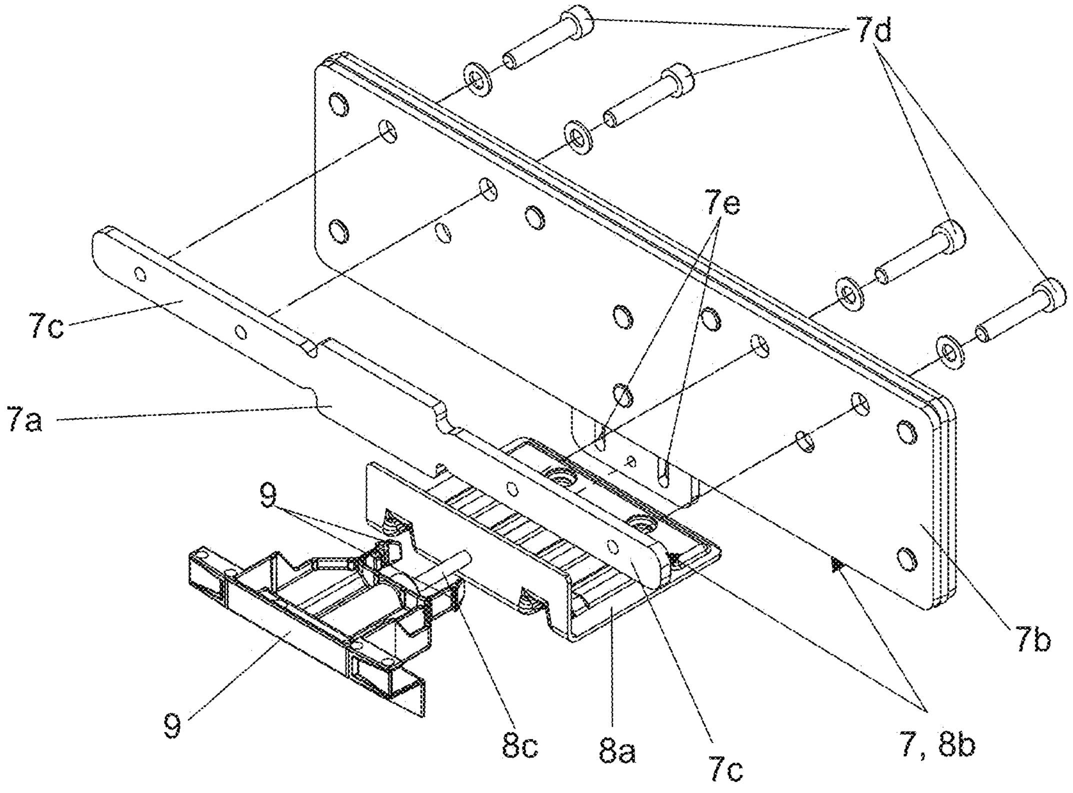
FIG. 4 is an exploded representation of an adjusting device as well as a covering cap.

FIG. 4 shows an exploded representation of an adjusting device 8 as well as a covering cap 9. The first element 8*a* and the second element 8*b*, which is formed by the connection device 7, are visible.

The covering cap 9 can be arranged on the second element 8*b* via snap-in elements 9*a*. For this, recesses 7*e* are provided on the second element 8*b*. The covering cap 9 can furthermore be shaped such that an adjusting element 8*c* can be accessed unhindered.

Figure 5A:
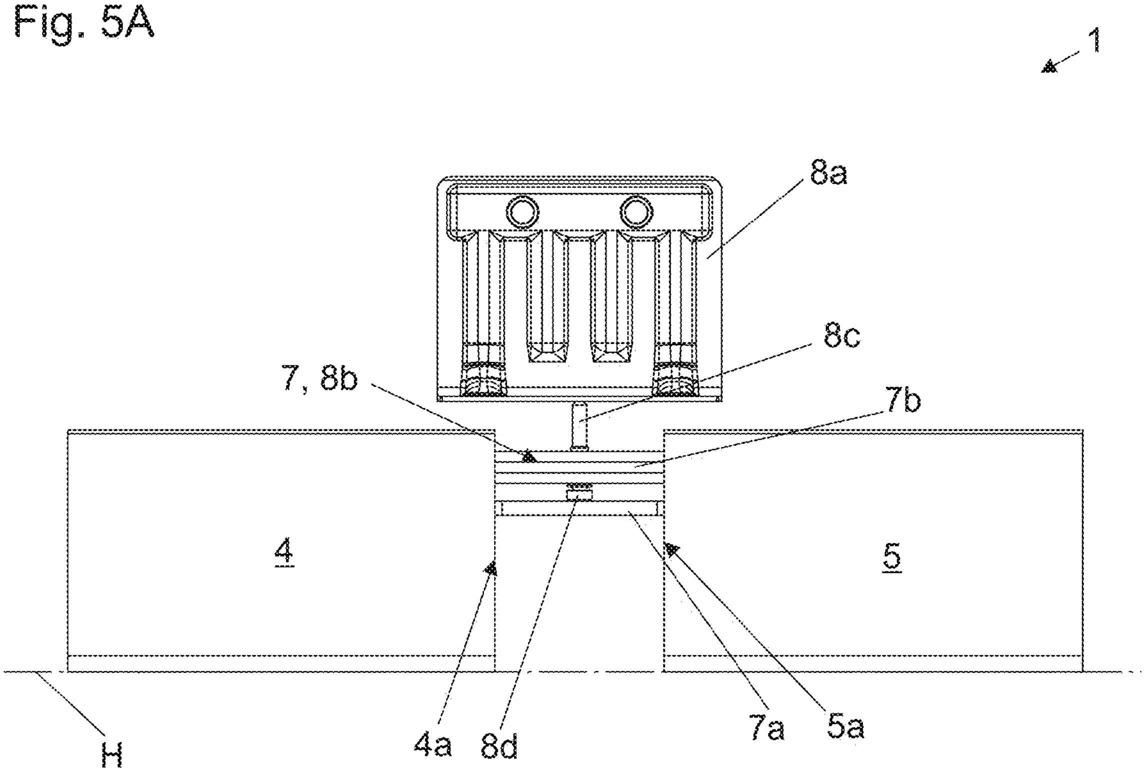
FIG. 5*a* is a top view of an embodiment of an arrangement before an adjustment process.

FIG. 5*a* shows a top view of an embodiment of an arrangement 1 before an adjustment process. It can be seen that the guide rails 4, 5 are parallel to a horizontal reference line H. A screwhead of the adjusting element 8*c* protrudes a little beyond the second element 8*b*.

Figure 5B:
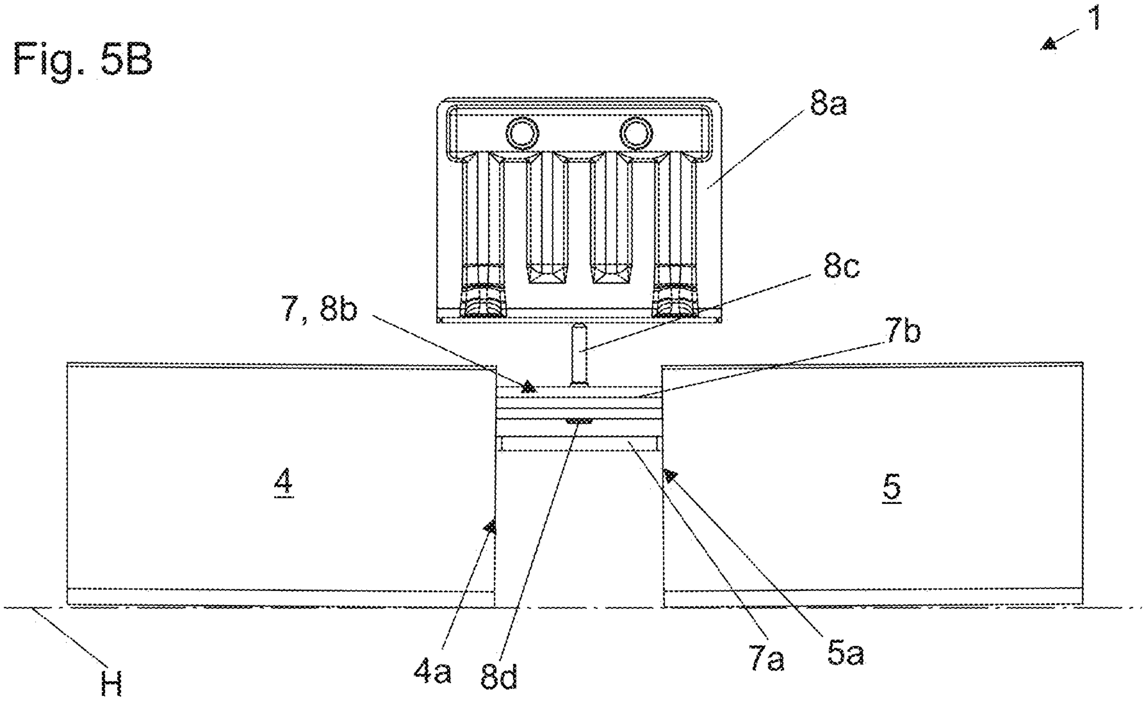
FIG. 5*b* is a top view of an embodiment of an arrangement after an adjustment process.

FIG. 5*b* shows a top view of an embodiment of an arrangement 1 after an adjustment process. The adjustment process was carried out by rotating the adjusting element 8*c*.

It can be seen that the adjusting element 8*c* now no longer protrudes beyond the second element 8*b*. The guide rails 4, 5 are no longer parallel to a horizontal reference line H.

The second element 8*b*, and therefore the ends 4*a*, 5*a* of the two guide rails 4, 5, has been moved relative to the first element 8*a*, in the present example moved away from it, through the rotation of the adjusting element.

A buckling of the furniture doors 2*a*, 2*b* in this area has thus been compensated for.

LIST OF REFERENCE NUMBERS

- 1. arrangement
- 2*a* first furniture door
- 2*b* other furniture door
- 3. stationary furniture part
- 4. first guide rail
  - 4*a* end
- 5. second guide rail
  - 5*a* end
- 6*a* first carriage
- 6*b* second carriage
- 7. connection device
  - 7*a* first clamping element
  - 7*b* second clamping element
  - 7*c* tabs
  - 7*d* means
  - 7*e* recesses
- 8. adjusting device
  - 8*a* first element
  - 8*b* second element
  - 8*c* adjusting element
  - 8*d* actuating device
- 9. covering cap
  - 9*a* snap-in element
- 10. gap
- 100. piece of furniture
- 101. cavity
- 102. side wall
- 103. door leaf
- 104. panel
- H reference line

The invention claimed is:

1. An arrangement for guiding at least two furniture doors relative to a stationary furniture part, the arrangement comprising:

a first guide rail and a second guide rail;

a first carriage mounted on, or mountable on, one of the first and second guide rails so as to be movable along the one of the first and second guide rails, the first carriage being connectable to a first one of the at least two furniture doors;

a second carriage mounted on, or mountable on, the other of the first and second guide rails so as to be movable along the other of the first and second guide rails, the second carriage being connectable to a second one of the at least two furniture doors;

a connection device configured to detachably connect the first and second guide rails at one end of each of the first and second guide rails, wherein the first and second guide rails are arranged substantially aligned with each other in a connected state; and an adjusting device configured to adjust a position of the ends of the first and second guide rails relative to the stationary furniture part in a direction transverse to a longitudinal extent of the first and second guide rails.

2. The arrangement according to claim 1, wherein the adjusting device has a first element arrangeable on a stationary furniture part.

3. The arrangement according to claim 2, wherein the adjusting device has a second element arrangeable on at least one of the two ends of the first and second guide rails.

4. The arrangement according to claim 3, wherein the second element is at least partially formed by the connection device.

5. The arrangement according to claim 1, wherein the adjusting device has an adjusting element.

6. The arrangement according to claim 2, wherein the adjusting device has a second element arrangeable on at least one of the ends of the first and second guide rails, wherein the adjusting device has at least one adjusting element, and wherein the adjusting element is mounted on or in the second element via a threaded connection and rests against the first element, or is mounted rotatably and non-displaceably on or in the first element.

7. The arrangement according to claim 2, wherein the adjusting device has a second element arrangeable on at least one of the ends of the first and second guide rails, wherein the adjusting device has at least one adjusting element, and wherein the adjusting element is mounted rotatably and non-displaceably on the second element and is mounted on or in the first element via a threaded connection.

8. The arrangement according to claim 5, wherein the adjusting element is formed as a screw.

9. The arrangement according to claim 5, wherein the adjusting device has an actuating device for indirectly or directly actuating the adjusting element.

10. The arrangement according to claim 9, wherein the actuating device is formed as a screwhead drive.

11. The arrangement according to claim 1, wherein the ends of the first and second guide rails face each other.

12. The arrangement according to claim 1, wherein a covering cap is provided for at least partially covering a gap between the first and second guide rails.

13. The arrangement according to claim 3, wherein a covering cap is provided for at least partially covering a gap between the first and second guide rails, and wherein the covering cap is arranged or arrangeable on the second element.

14. A piece of furniture comprising:

at least two furniture doors; and a stationary furniture part having the arrangement according to claim 1.

15. The arrangement according to claim 3, wherein the second element is arrangeable on both of the ends of the first and second guide rails.

16. The piece of furniture according to claim 14, wherein the at least two furniture doors are folding sliding doors.

* * * * *